United States Patent [19]

Overbay

[11] Patent Number: 4,804,817

[45] Date of Patent: Feb. 14, 1989

[54] BEARING CONNECTOR FOR ROTARY TOOL

[75] Inventor: Mark A. Overbay, East Ridge, Tenn.

[73] Assignee: Combustion Engineering, Inc., Windsor, Conn.

[21] Appl. No.: 28,997

[22] Filed: Mar. 23, 1987

[51] Int. Cl.[4] ............................................. B23K 9/24
[52] U.S. Cl. .................................. 219/136; 219/60 A; 219/75; 439/17
[58] Field of Search ............... 219/60 A, 60 R, 60.2, 219/74, 75, 125.11, 136; 439/17, 5; 174/9 F

[56] References Cited

U.S. PATENT DOCUMENTS

| | | | |
|---|---|---|---|
| 3,084,243 | 4/1963 | Gotch | 219/60 A |
| 3,123,421 | 3/1964 | Phillips | 439/17 |
| 3,395,263 | 7/1968 | Kazlauskas | 219/125.11 |
| 3,701,072 | 10/1972 | Bjorn et al. | 439/5 |
| 3,740,520 | 6/1973 | Daughenbaugh | 219/60 A |
| 3,780,257 | 12/1973 | Stevens | 219/125.11 |
| 4,047,656 | 9/1977 | McCombs | 228/27 |
| 4,510,372 | 4/1985 | Kobuck | 219/125.11 |
| 4,580,028 | 4/1986 | Kobuck | 219/85 R |

FOREIGN PATENT DOCUMENTS

| | | |
|---|---|---|
| 2230288 | 6/1972 | Fed. Rep. of Germany . |
| 574800 | 9/1977 | U.S.S.R. ............ 439/17 |
| 1054294 | 1/1967 | United Kingdom . |
| 1229609 | 4/1971 | United Kingdom . |
| 1482741 | 8/1977 | United Kingdom . |

*Primary Examiner*—Clifford C. Shaw
*Attorney, Agent, or Firm*—John H. Mulholland

[57] ABSTRACT

A tool having a rotating hollow electrode is provided power through a rotary electrical connection in the form of ball bearings and conductive lubricant, with a fixed hollow power supply fitting mounted in and insulated from a housing structure journaled in the bearings. Gas for welding is supplied through the hollow fitting and electrode which are in fluid communication.

11 Claims, 1 Drawing Sheet

4,804,817

BEARING CONNECTOR FOR ROTARY TOOL

BACKGROUND OF THE INVENTION

Rotary electrical connections are important in tools where an electrode is rotated to perform work within a hole, tube or tube type of plug. The present invention is an improved rotary electrical connection for use in tools or machines of the type which may employ rotating electrodes to perform operations such as welding or tube plug shrinking according to the method of U.S. Pat. No. 3,986,245, assigned to the same assignee as the present application.

The purpose of the new rotary electrical connector is to conduct a sustained or intermittent current from a fixed power source to a rotating electrode to produce a high frequency arc while presenting very little frictional resistance to rotation and heat damage to the rotating connector parts. It is ideal for use in a tool of the type which is small enough to be used on a job site, as for instance, within a nuclear steam generator.

When the rotary connector is utilized in a mechanical tube plug shrinker or rotary welder, benefits of compactness of the device, immunity of arcing to undesired ground paths and inherent stability and precise arc placement are provided. Moreover, the component parts of the rotary connector are readily available from commercial sources with sizes chosen on the basis of power requirements.

SUMMARY OF THE INVENTION

The invention is a tool having a rotating elongated electrode member with a central longitudinal axis of rotation coaxially mounted on a conductive cup which relates about the longitudinal axis within a housing. A hollow electrically conductive power source member is fixed to the housing with a journal portion extending in spaced relation with the cup. A zone of overlap of the cup and the journal on the fixed power source member creates a gap or annular space between the cup interior and the journal. An electrically conductive ball bearing or roller bearing assembly is located in the gap and acts as a rotary electrical connector. Other bearing means mounted in the housing add stability to the rotating electrode through an outer insulating member fixed to rotate with the conductive cup and the electrode. A belt drives the cup and electrode from a pulley concentrically fixed to the exterior of the insulating member. The end of the electrode is shielded by means of a hollow ceramic mast structure secured to the rotating structure. The fixed hollow power source member and the rotating hollow electrode are in fluid communication to permit the flow of welding gas to the electrode end from a gas source connected to the end of the power source member.

The rotary connector is a commercial ball or roller bearing sized according to power requirements. Typical, would be an appropriate needle roller bearing such as sold by Winfred M. Berg, Inc. of East Rockaway, N.Y. 11518 as stock number "NRB-47" or ball bearing, stock number "BI-30", from the same source. The bearings are washed in a suitable solvent to remove the pre-applied lubricant provided by the manufacturer and then re-lubricated with a suitable electrical joint compound and lubricant such as that sold by Tweco Products, Inc. of Wichita, Kans. Thus treated, the bearings have been found to provide precise arc placement and rotational stability and good electrical conductance which does not increase the bearing temperature to a damaging level. Accordingly, reliable and compact tools for plug removal, welded tubesheet plug installation, nozzle dam insert welding, tube pulling and tube sleeving can be provided using ball or roller bearings for the rotary electrical connector as well as the bearing function.

DETAILED DESCRIPTION OF THE PREFERRED EMBODIMENT

Figure 2:
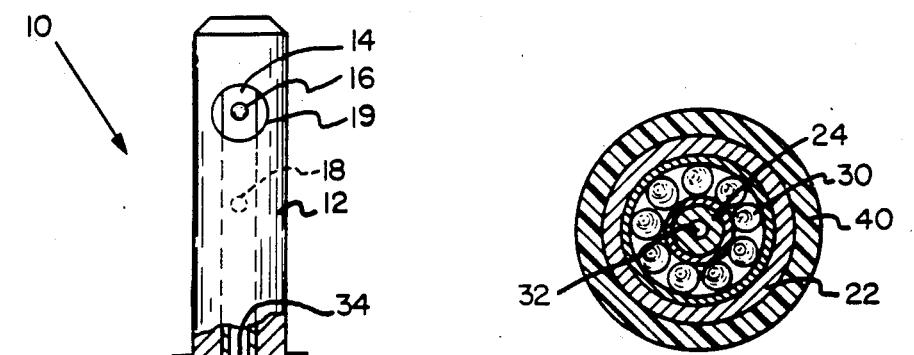
FIG. 2 is a cross-sectional view taken along the line 2—2, through the zone of overlap, of the rotary electrical connection in FIG. 1.
Figure 1:
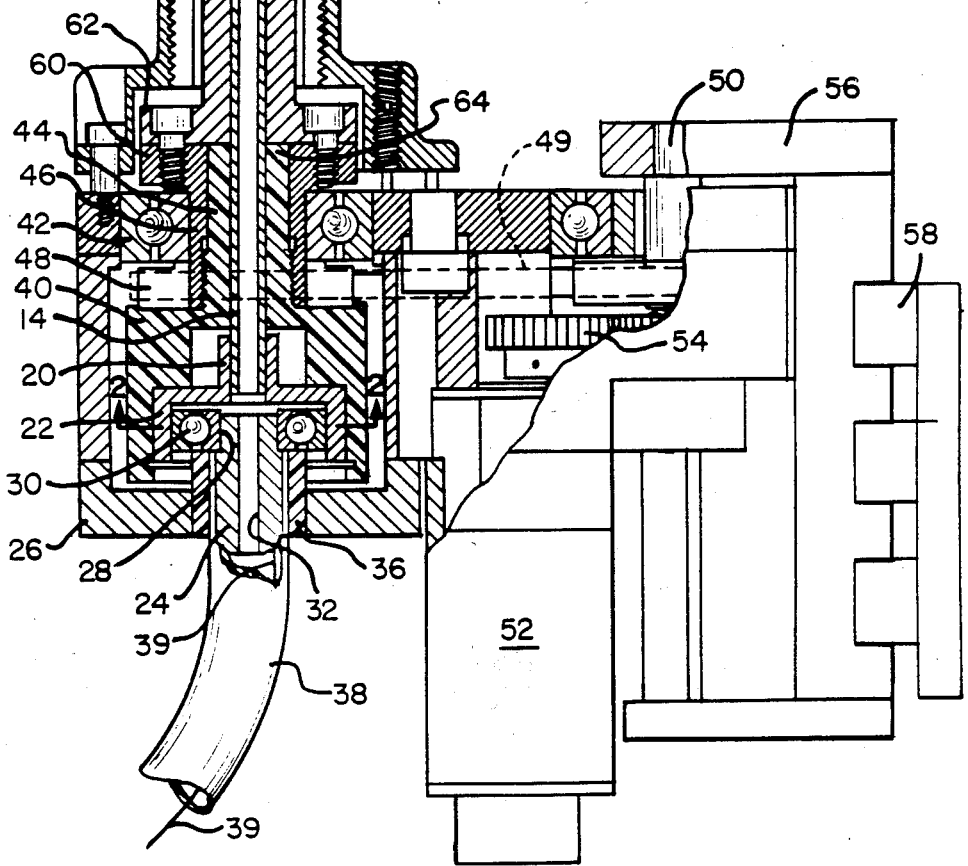
FIG. 1 is a side elevational view, broken away for clarity, of a tool incorporating a rotary electrical connection according to the principals of the invention.

The numeral 10 generally designates a tool having an elongated member, at least a portion of which is a rotating electrically conductive member, which incorporates a rotary electrical connection provided according to the principles of the invention. As shown, the tool 10 is a mechanical tube plug shrinker which is used to establish a gas-tungsten-arc (GTA) between the electrode and the inner surface of the wall of a steam generator tube plug, such as might be used in a nuclear steam supply system. The method of use of the tool is fully described in U.S. Pat. No. 3,986,245. Typically, it is used to originate a GTA near the upper end of a plug and to simultaneously linearly translate downwardly, and rotate within the plug, an arc which produces a spiraling, overlapping weld bead on the plug inner surface.

The tool 10 includes a rotating hollow ceramic mast 12 with an elongated electrode 14 mounted therein for rotation therewith. The hollow electrode 14 is typically of copper and is provided with a hole 16 in which a piece of tungsten is mounted for producing an arc, in a manner well known to those skilled in the art. An opening 18 in the electrode 14 permits argon gas used in the process to flow from the interior of the electrode 14 outwardly, along its outer surface adjacent the inner surface of the ceramic member 12, into the arc producing area which is surrounded by an opening 19 in the ceramic mast 12. The electrode 14 is mounted, as by crimping, in a split collar or collet 20 which is an integral part of an annular conductive cup 22. The conductive cup 22 is, typically made of hard brass and rotates with the mast structure 12 and its electrode 14. A fixed electrically conductive hollow member 24, variously referred to as "a fixed power conducting member 24", "a fixed power supply fitting 24", "a fixed power fitting 24", "a hollow fixed power fitting 24", "power fitting 24" or "a fixed electrically conductive member" is secured to a housing structure 26 of the tool in concentric relationship with the rotating conductive members 14 and 22, about their axis of rotation. A zone of overlap of the rotating cup member 22 and the fixed power conducting member 24, within an annular cavity of the cup 22, forms an annular gap defined by the radial spacing of the rotating annular cup 22 and the fixed power supply fitting 24, the upward end of which has a journal portion 28.

Between the inside annular wall of the cup 22 and the journal portion 28 of the fixed power fitting 24, the annular gap contains a conductive anti-friction means in the form of ball bearings 30. The bearings are, typically, made up of an inner race and an outer race with a plurality of balls therebetween which orbit the axis of the annular journal 28 received therein. The ball bearings 30 are lubricated with a conductive material, as mentioned earlier, and are commercially available stainless steel or other suitable conductive material.

The hollow fixed power fitting 24 has a central passageway 32 in fluid communication with the central passageway 34 of electrode 14. An electrically insulating clamp 36, made from a plastic material such as DELRIN, secures a gas supply tube 38 to the power fitting 24, while insulating it from the housing 26. A conductor 39 within the tube 38 supplies current to the power fitting 24 from a suitable power source, as will be readily understood by those skilled in the art.

An outer annular cup structure 40, also of plastic electrical insulating material such as DELRIN, insulates the annular cup 22 and the electrode 14 at its lower end where it is secured by means of the collet portion 20. The insulating member 40 prevents undesired arcing between the annular cup 22, the electrode 14 and the housing 26. Bearings 42 engage an annular extension 44 of the cup 40 to provide increased rotational stability to the mast 12 and electrode 14 during their rotation. Extension 44 has, on its exterior, a surrounding metal member 46 which acts both as the journal within bearings 42 and the support for a drive pulley flange portion 48 which drives the rotational parts. The rotational drive is accomplished by means of a belt 49, shown in phantom in the drawing as connected to a driving shaft and pulley arrangement 50. The shaft 50 is driven by a motor 52 through a gear connection 54.

The entire tool 10, including motor 52, is supported by means of a conventional mounting structure 56. A connection by means of a dovetail bracket 58 holds the tools in position for use, for example, on the underside of a tube sheet of a steam generator of a nuclear steam supply system.

The ceramic mast 12 has an integral flange 62 by which it is mounted and secured to a flange 60 on the upper end of the metal member 46 of the rotating structure. A suitable 0-ring seal 64 about the electrode 14 at the end of the mast 12 prevents the back leakage of gas along the electrode outer surface 14 within the bore of the mast 12.

The novel bearing connector for rotary tools made according to the principal of the invention, and described herein in connection with a mechanical tube plug shrinker, will find use wherever tools having elongated members, at least a part of which is a rotating electrically conductive member, are needed in a compact size such as required for use in steam generator tubes. Accordingly, using the bearing connector invention, a reliable and compact tool for plug removal, welded tube sheet plug installation, nozzle dam insert welding, tube pulling and tube sleeving can be provided.

I claim:

1. In a tool having an elongated member with a central longitudinal axis of rotation, at least a part of which elongated member is a rotating electrically conductive welding current carrying member which rotates coaxially about the central longitudinal axis, said tool further characterized by:
    a fixed electrically conductive welding current carrying member concentrical with said rotating conductive member about the axis of rotation;
    a zone of overlap of said rotating electrically conductive welding current carrying member and said fixed welding current carrying conductive member with one spaced from the other in a radial direction to form a gap;
    conductive anti-friction means for orbiting the axis of rotation within said zone of overlap and gap and electrically and rotationally connecting said rotating member and said fixed member, thereby providing the only welding current carrying connection therebetween; and,
    the rotating member and the fixed member each having a central fluid passageway in communication with the other.

2. The tool of claim 1 in which the conductive anti-friction means for orbiting and electrically connecting are ball bearings or roller bearings.

3. The tool of claim 2 in which the conductive anti-friction means includes conductive lubricant material.

4. The tool of claim 1 in which the rotating electrically conductive member includes an annular cup and said fixed electrically conductive member includes a journal and the gap in the zone of overlap is between an inside wall surface of said cup and said journal.

5. The tool of claim 4 in which the rotating electrically conductive member includes an annular cup, said fixed electrically conductive member includes a journal, and said annular cup is electrically connected to an electrode which rotates with it.

6. The tool of claim 5 in which the electrode is mounted within a rotating electrical insulation portion of the elongated member.

7. The tool of claim 6 in which the rotating electrical insulation portion is part of a means for rotationally driving the rotating member.

8. The tool of claim 6 in which the rotating electrical insulation portion, the electrode, the annular cup and the fixed electrically conductive member are hollow and in fluid communication such that a gas may flow therethrough.

9. The tool of claim 8 in which a means for supporting tungsten is provided adjacent the end of the electrode and the tool includes a means to rotate the elongated member.

10. The tool of claim 1 which includes means for rotationally driving the rotating member.

11. The tool of claim 10 which includes a rotating electrical insulation portion in addition to the rotating electrically conductive member defining a part of the elongated member and the means for rotatingly driving the rotating member includes the rotating electrical insulation portion of the elongated member.

* * * * *